Jan. 9, 1951 W. F. MUNN 2,537,846
KNIFE-EDGE LIGHT STOP FOR MICROSCOPES
Filed June 25, 1947

Inventor
William Faitoute Munn
By Ramsey, Kent & Chisholm
Attorneys

Patented Jan. 9, 1951

2,537,846

UNITED STATES PATENT OFFICE 2,537,846

KNIFE-EDGE LIGHT STOP FOR MICROSCOPES

William Faitoute Munn, West Orange, N. J.

Application June 25, 1947, Serial No. 757,005

7 Claims. (Cl. 88—40)

This invention relates to optical devices and, more particularly, to an attachment for a system of lenses, e. g. a microscope.

In many optical devices, particularly those such as cameras, telescopes and compound microscopes (hereinafter referred to as microscopes) where an image is formed through a single system of lenses, there is no binocular effect and the sense of depth in the image formed is lost to a very marked extent. This sense of depth may be somewhat restored in a microscope by illuminating the object with light falling thereon at an angle to the axis of the microscope rather than axially thereof so as to produce light and shadows on the object, thus creating to some degree an effect of depth. An effect of depth is very important in obtaining clear images, disclosing the true nature of the object being studied, whether for direct observation or for microphotographs.

In the form of the present invention shown, a knife edge has been placed at a principal focus of the eyepiece lens or lens system of a microscope and introduced from one side into the image-forming light passing through such lens a sufficient distance to intercept some of the light. The effect of this interception is somewhat similar, but superior to that obtained from oblique lighting of the object but is accomplished with the normal axial lighting of the object. As the knife is slowly moved to intercept the image-forming light rays, it will be noted that, at a certain point in the knife's movement, a very marked effect of depth occurs in the image formed by the microscope, crystals or transparent fibers standing out in relief in the image so as to be readily observable in detail. The attachment to be described is adaptable for application to any microscope or similar system of lenses and, upon modification, can be applied to other lens systems.

An object of the present invention is to improve the image formed from a microscope or other lens system.

Another object of the invention is to obtain in a microscope or other lens system an improved three-dimensional effect, or effect of depth, so as to obtain greater detail in the image formed.

Further objects and objects relating to details and economies of construction will more definitely appear from the detailed description to follow.

My invention is clearly defined in the appended claims. Where parts are, for clarity and convenience, referred to on the basis of their oriented position shown in the accompanying drawing, no limitation as to positioning of the entire structure is to be implied, since it will be understood that the entire structure can be inverted, and that it can be used in an inclined position. Also in both the description and the claims, parts at times may be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawing forming part of this specification, in which:

Figure 1:
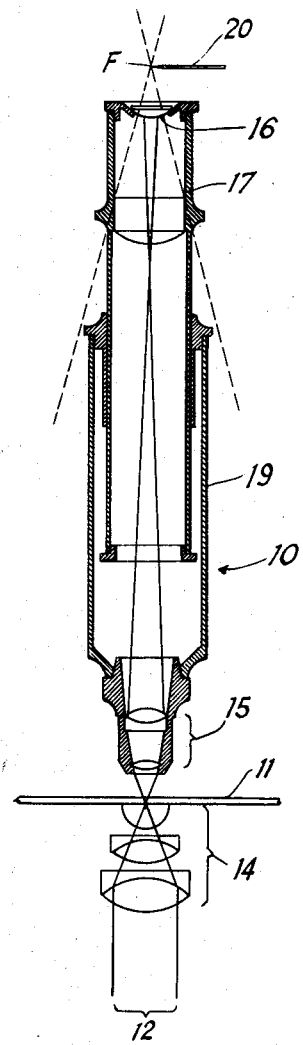
Fig. 1 is a diagrammatic view of a microscope incorporating the present invention.
Figure 3:
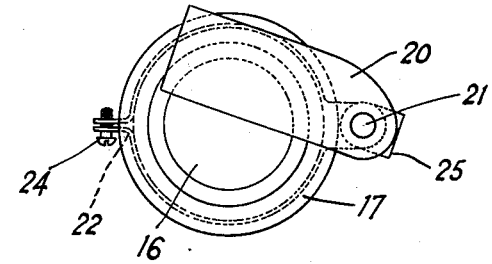
Fig. 3 is a top plan view of the portion of the microscope and the attachment shown in Fig. 2.

Referring to the drawings, my attachment may be placed on a conventional microscope 10. This microscope, which is indicated diagrammatically in Fig. 1, is provided with an object slide 11 which is illuminated in the conventional manner by axial light rays 12 passing through a series of lenses forming a light condenser 14. The matter to be examined is mounted on the slide 11 in usual fashion; and the light from the slide is transmitted through an object lens 15 which may, and usually does, comprise a series of individual lenses.

The light from the slide 11, after passing through the object lens 15, passes upwardly axially of the microscope and through an eyepiece lens 16, as is well-known. The eyepiece lens 16 likewise is usually comprised of several individual lenses. The distance of the eyepiece lens 16 from the object lens 15 is adjusted by mounting the eyepiece lens in the upper end of an eyepiece or tube 17 which is telescopable axially of the main tube 19 of the microscope.

The image is observed by placing the eye of the observer somewhat above the eyepiece lens 16. If a permanent record is to be made of the image formed in the microscope 10, a camera may be positioned over the eyepiece lens 16 in place of the observer's eye to take a picture or photomicrograph of the image formed in the microscope 10. The foregoing form of microscope is conventional and well-known.

I have found that the image formed by a microscope may be greatly improved by placing a knife edge 20 in the image-forming light rays at the principal focus F of the eyepiece lens 16 above the lens. The knife edge 20 is preferably formed as a straight edge from a thin flat strip of metal and positioned in a plane at right angles to the axis of the microscope. Since the eye of an observer is placed above the principal focus F of the eyepiece lens 16, the knife edge 20 does not interfere with observation of an image in the microscope.

I have found that as the knife edge 20 is slowly moved from one side of the axis of the microscope 10 to partially intercept the image-forming rays of light passing through the eyepiece lens 16, the image formed by the microscope is suddenly improved. While previously the image had had little or no appearance of depth, the image at once takes on an effect of depth or relief which is not ordinarily obtainable without binocular vision. It appears as though crystals or membranes of the object cast shadows, thus permitting and facilitating a closer study of the object being examined. This effect is somewhat analogous but vastly superior to that obtained by oblique illumination of the object slide 11.

The phenomenon above described occurs when the knife edge 20 is placed so as to intercept only a portion of the image-forming light rays from a single side of the eyepiece lens 16. There is a certain optimum position of the knife edge 20 in which the relief effect is obtained but the entire field is not noticeably darkened. This position is conveniently obtained by slowly advancing the knife edge 20 toward the axis of the microscope at the principal focus F of the eyepiece lens 16 while observing the image. A rather exact adjustment of the knife edge 20 is required to obtain the above-described effect to best advantage.

If the knife edge 20 is appreciably above or below the principal focus F of the eyepiece lens 16, a definite darkening of only a portion of the field results and no relief effect is obtained. This darkening is on the side toward or away from the knife edge, depending upon whether the knife edge 20 is above or below the principal focus F, respectively, of the eyepiece lens 16.

At the same time that the relief or depth effect of the image formed by the microscope 10 is improved by interpositioning of the knife edge 20, one side only of the field of view is slightly darkened but the entire field is not so darkened. The darkened side of the field of view is opposite to that on which the knife edge 20 is introduced. For this reason, I prefer to introduce the knife edge 20 into the image-forming light rays from the side opposite to that of the observer, thus throwing the shadows of the relief image toward the observer so as to obtain an image to which the human eye is more accustomed.

I am unable to explain the physical phenomena above described but believe it to be due in some manner to diffraction due to partial interception of the image-forming light rays at a principal focus of the eyepiece lens 16. I have determined that if the image-forming light rays are symmetrically intercepted at the principal focus of the eyepiece lens, the entire field is darkened equally and no relief or depth effect is obtained. However, it is not essential that a knife edge be employed, since I have obtained comparable results with a flat opaque member having a straight edge of substantial thickness which is moved into the image-forming rays at the focus of the eyepiece lens.

Figure 2:
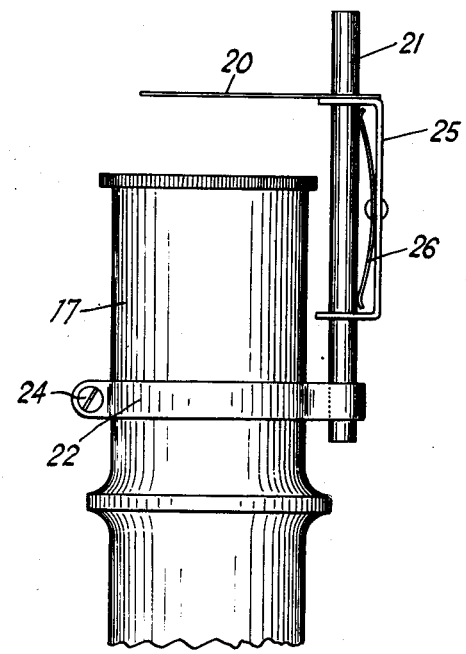
Fig. 2 is an elevation, on an enlarged scale, of the top and eyepiece portion of a microscope, including an elevation of the image-improving attachment.

Referring to Fig. 2, my microscope attachment preferably includes a round upright post 21 secured to the microscope beside the eyepiece lens 16 by a split ring 22 clamped about the eyepiece 17 by a screw 24. The post 21 receives a slide 25 having two spaced holes, the slide being capable both of rotation and reciprocation on the post. A leaf spring 26 is secured to the slide 25 and bears against the post 21 to cause the slide to frictionally engage the post and remain in any set position.

The knife edge 20 may be mounted directly on the slide 25. It may be formed of a flat piece of steel having a straight thin edge and mounted in a plane perpendicular to the axis of the microscope. Preferably it does not extend far beyond the periphery of the eyepiece 17 to permit the hood of a camera to be passed about the eyepiece when making a photomicrograph.

The above-described mounting for the knife edge 20 serves as a ready means for positioning it at the level of the principal focus F above the eyepiece lens 16 and for adjusting it into the image-forming light rays to obtain the best image of the object being studied, as above described.

This attachment can also be used without modification when using the microscope in the taking of photomicrographs. In such case the microscope is adjusted, including adjustment of the knife edge 20 to secure the best image. A suitable camera, not shown, is then positioned above the microscope in the conventional manner to take the photomicrographs.

I claim:

1. In a compound microscope for viewing or photographing an object or material mounted on a conventional slide, the microscope having an objective lens and an eyepiece lens formed of at least two individual lenses, the improvement which comprises: a member disposable at the principal focus and beyond said eyepiece lens in the optical system and unsymmetrically of the axis of the eyepiece lens to intercept a portion of the image-forming light passing therethrough.

2. In a compound microscope for viewing or photographing an object or material mounted on a conventional slide, the microscope having an objective lens and an eyepiece lens formed of at least two individual lenses, the improvement which comprises: a thin flat knife edge positionable above said eyepiece lens at the principal focus thereof to intercept unsymmetrically relative to the axis thereof image-forming light passing through said eyepiece lens.

3. In a compound microscope for viewing or photographing an object or material mounted on a conventional slide, the microscope having an objective lens and an eyepiece lens formed of at least two individual lenses, the improvement which comprises: a thin, flat knife edge supported at the principal focus and beyond said eyepiece lens in the optical system, and means for adjusting said knife edge to unsymmetrically intercept image-forming light passing through said eyepiece lens.

4. In a compound microscope for viewing or photographing an object or material mounted on a conventional slide, the microscope having an objective lens and an eyepiece lens formed of at least two individual lenses, the improvement which comprises: a thin, flat knife edge supported for movement in a plane perpendicular to the axis of said eyepiece lens at the principal focus beyond said lens in the optical system, and means for adjusting said knife edge to unsymmetrically intercept image-forming light passing through said eyepiece lens.

5. In a compound microscope for viewing or photographing an object or material mounted on a conventional slide, the miscroscope having an objective lens and an eyepiece lens formed of at least two individual lenses, the improvement which comprises: a thin, flat knife edge supported for movement in a plane perpendicular to the axis of said eyepiece lens at the principal focus beyond said lens in the optical system, and a stationary post and slide rotatably mounted on said post for adjustably mounting said knife edge.

6. In a compound microscope for viewing or photographing an object or material mounted on a conventional slide, the microscope having an objective lens and an eyepiece lens formed of at least two individual lenses, the improvement which comprises: a thin flat knife edge supported for movement in a plane perpendicular to the axis of said eyepiece lens at the principal focus beyond said lens in the optical system, a round stationary post mounted on the eyepiece parallel to the axis of the miscroscope, and a slide rotatably and reciprocably mounted on said post and frictionally engaging said post and mounting said knife edge, the frictional engagement of said slide maintaining the knife edge in adjusted position.

7. In a microscope for viewing or photographing an object or material mounted on a conventional slide, the microscope having an objective lens and an eyepiece lens formed of at least two individual lenses, the improvement which comprises: a thin, flat knife edge movable in a plane perpendicular to the axis of said eyepiece lens at the principal focus beyond the eyepiece lens in the optical system, a round stationary post mounted on the eyepiece parallel to the axis of the microscope, a slide rotatably and reciprocably mounted on said post, and a member attached to the slide and resiliently engaging the post to retain the slide in adjusted position, the knife edge being mounted on the slide.

WILLIAM FAITOUTE MUNN.

REFERENCES CITED

The following references are of record in the file of this patent:

UNITED STATES PATENTS

| Number | Name | Date |
| --- | --- | --- |
| 1,463,938 | Carter | Aug. 7, 1923 |
| 1,503,800 | Ott | Aug. 5, 1924 |
| 1,521,339 | Taylor | Dec. 30, 1924 |
| 1,754,282 | Owens | Apr. 15, 1930 |
| 1,784,425 | George | Dec. 9, 1930 |
| 2,034,096 | Hauser | Mar. 17, 1936 |
| 2,237,943 | Lihotsky | Apr. 8, 1941 |

FOREIGN PATENTS

| Number | Country | Date |
| --- | --- | --- |
| 350,336 | Germany | Mar. 20, 1922 |

OTHER REFERENCES

Bell: "The Telescope," 1st edition, page 212, published by McGraw-Hill Book Co., Inc., New York city, 1922.

Edser: "Light for Students," pages 98–99, published by MacMillan & Co., Ltd., London, 1944.

Strong: "Procedures in Experimental Physics," pages 69 to 72, published by Prentiss-Hall, Inc., New York city, 1946.